(12) United States Patent
Lustgarten et al.

(10) Patent No.: US 6,389,398 B1
(45) Date of Patent: May 14, 2002

(54) SYSTEM AND METHOD FOR STORING AND EXECUTING NETWORK QUERIES USED IN INTERACTIVE VOICE RESPONSE SYSTEMS

(75) Inventors: Paul C. Lustgarten, Westfield; Thomas Clavin Cannon, Jr., Bedminster, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/338,890

(22) Filed: Jun. 23, 1999

(51) Int. Cl.[7] ............................................. G10L 15/22
(52) U.S. Cl. ..................... 704/275; 704/270; 379/88; 379/90.1
(58) Field of Search ................................ 704/275, 270; 379/88.14, 88.22, 90.1, 88.17, 67.1, 900, 908, 265.01, 265.02, 266.07, 265.09; 707/3, 103

(56) References Cited

U.S. PATENT DOCUMENTS

| | | | | |
|---|---|---|---|---|
| 5,813,014 A | * | 9/1998 | Gustman | 707/103 |
| 5,862,325 A | * | 1/1999 | Reed et al. | 395/200.31 |
| 5,884,262 A | * | 3/1999 | Wise et al. | 704/270 |
| 5,907,837 A | * | 5/1999 | Ferrel et al. | 707/3 |
| 5,953,392 A | * | 9/1999 | Rhie et al. | 379/88.13 |
| 6,064,723 A | * | 5/2000 | Cohn et al. | 379/88.14 |
| 6,088,429 A | * | 7/2000 | Garcia | 379/88.22 |
| 6,088,717 A | * | 7/2000 | Reed et al. | 709/201 |
| 6,119,101 A | * | 9/2000 | Peckover | 705/26 |
| 6,199,060 B1 | * | 3/2001 | Gustman | 707/3 |

* cited by examiner

Primary Examiner—William Korzuch
Assistant Examiner—Susan McFadden
(74) Attorney, Agent, or Firm—Jean-Marc Zimmerman

(57) ABSTRACT

An IVR system for an information network and method for storing and executing user queries stored on the network so that such queries do not have to be re-entered each time a user wants to access information from or execute a transaction on the network. The system can also be programmed to automatically execute the query at a predetermined time or times, and deliver information retrieved from the network and/or confirmation of the execution of a transaction on the network to the user in a format specified by the user.

19 Claims, 3 Drawing Sheets

SYSTEM AND METHOD FOR STORING AND EXECUTING NETWORK QUERIES USED IN INTERACTIVE VOICE RESPONSE SYSTEMS

FIELD OF THE INVENTION

This invention relates to interactive voice response ("IVR") systems, and more particularly to a network based IVR system and method for storing and executing user queries on the network.

BACKGROUND OF THE INVENTION

Many conventional information networks include IVR systems which callers use to access information stored on the network, such as a checking account balance or a stock price quote, and/or to execute commercial transactions, such as paying bills or purchasing goods. Conventional IVR systems prompt users to navigate through a menu of options by entering a query either in the form of a sequence of dial tones and pauses produced by pressing keys on a telephone touch pad or computer keyboard, and/or in the form of a voice command. Queries comprised of key strokes corresponding to a telephone number and menu option selections for navigating through a particular IVR system can be stored on devices such as a telephone speed dialer and automatically dialed by pressing a single button to more easily access a frequently called number.

However, conventional IVR systems suffer from several drawbacks. First, each time a user wants to access information from or execute a transaction on a particular IVR system, the user must reenter their query even if the query is pre-recorded on a device such as a telephone speed dialer. This can often be a time consuming process since the query may have to navigate through a lengthy series of prompts in order to access the desired information or execute the desired transaction. Second, users have to separately program each telephone handset they wish to use to execute a pre-recorded query. Third, conventional telephone handsets can only store a limited number of queries, thereby limiting the number of queries a user can pre-rerecord.

SUMMARY OF THE INVENTION

A network based system and method for storing and executing queries on an IVR system, wherein a user can store a frequently used query on the network so that they do not have to enter the query each time they want to access information from or execute a transaction on the network. The system also enables a user to program when and how often a query is executed, and where and in what form information retrieved from the network and/or confirmation of the execution of a transaction on the network is delivered to the user.

DETAILED DESCRIPTION OF THE INVENTION

Figure 1:
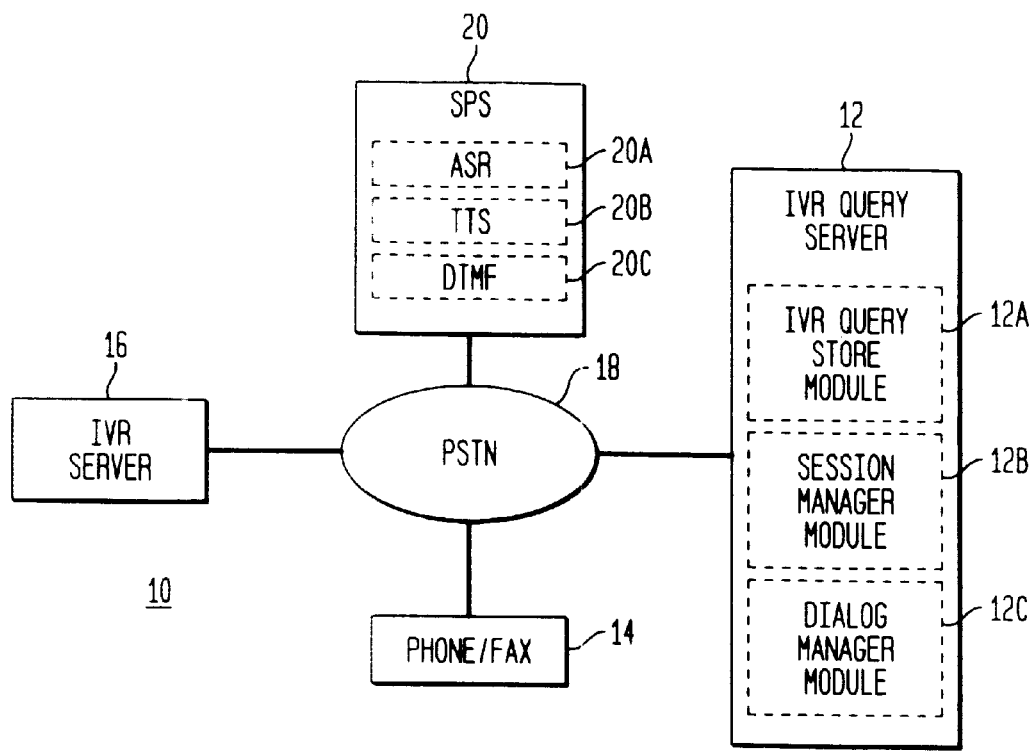
FIG. 1 shows a first exemplary embodiment of an IVR system for storing network queries according to the present invention.

FIG. 1 shows an exemplary embodiment of an IVR query system 10 according to the present invention for automatically and selectively accessing information stored on telephony and data networks, and delivering such information to end users, either on demand or on a pre-scheduled basis. System 10 is a network based messaging system in which an IVR query server 12 stores and executes queries entered by users using a telephone 14. Queries executed by IVR query server 12 are forwarded to IVR server 16 via public switch telephone network (PSTN) 18 to either retrieve information stored on server 16 or to use such stored information to perform certain requested transactions.

Speech processing server (SPS) 20 is coupled to PSTN 18 and provides speech processing algorithms which enable system 10 to recognize and record human speech, and enable IVR query server 12 to have interactive sessions with users. Although PSTN 18 and SPS 20 can each reside on a single machine, both of these components are depicted separately in the embodiment shown in FIG. 1 to simplify the description of system 10. The processing algorithms provided by SPS 20 include an automatic speech recognition (ASR) algorithm 20A for converting human speech to text, a text to speech (TTS) algorithm 20B for converting text to human speech, and a Dual Tone Multiple Frequency (DTMF) algorithm 20C for detecting and generating telephone dial tones, canceling echoes on the telephone line, and connecting system 10 to external communication devices such as telephone 14.

IVR query server 12 includes an IVR query store module 12A which stores queries and intelligently replays them at a future time, a session manager module 12B which manages call set-up, termination, and data transmission of incoming and outgoing calls between IVR query server 12 and telephone 14, and a dialog manager module 12C, implemented as a software module, which composes queries either by means of a voice recording or a file transmission, and replays the queries.

In order to avoid having to re-enter a sequence of keystrokes, pauses and/or voice commands which comprise a query each time a user desires to access the same information from system 10, the user can instead store the query as a file that can be executed within the IVR menu of system 10 each time the user desires to repeat the particular query. Such queries can be stored on system 10 as messages in a voice-mail system accessed through the natural language telephone interface of SPS 20 which recognizes spoken words. Once a specific query has been created and named, users can use telephone 14 to dial into system 10 using the pre-recorded query to retrieve the desired information and/or perform the desired transaction. System 10 can execute queries from any telephone able to access the network, and can store a large number of queries.

Users can create queries on system 10 either implicitly or explicitly. Users create queries implicitly by recording and naming specific navigation paths through an IVR menu using IVR query server 12 by entering a sequence of keystrokes, pauses and/or voice commands on telephone 14 as the caller engages in a live transaction. Users create messages explicitly by programming a query off-line using telephone 14.

System 10 executes stored queries in an intelligent fashion using three levels of progressively more sophisticated intelligence. During the first and most basic level of intelligence, the recorded sequence of stored dial tones, pauses and/or voice commands are replayed as they were originally recorded. During the second level of intelligence, pauses of fixed duration are replaced with variable-length pauses, wherein the energy level of a signal is monitored and the next tone or spoken word in a query is transmitted when the energy level exceeds a predetermined value. This stabilizes system 10 against variations in programmed response times resulting from system 10 being overloaded. During the third and most sophisticated level of intelligence, a combination of ASR and DTMF algorithms enable system 10 to understand the prompts it emits to user queries, thereby enabling system 10 to transmit an appropriate response to a query from its stored inventory of spoken word utterances, dial tone sequences and/or pauses via IVR query server 12.

System 10 can be programmed by users to automatically execute IVR queries on a periodic basis or at a predetermined time, and deliver the information retrieved by the query to the user via any format specified by the user. For example, a user may program a query to retrieve a stock quote everyday at a specific time. The user can program system 10 to deliver this stock quote via a facsimile transmission, an e-mail message, a voice mail message, etc. Users may also program multiple queries to be executed periodically, with each query having its own delivery schedule and mode of delivery. Alternately, a user can elect to have all of the information retrieved from multiple queries consolidated and delivered as a single message or document.

Figure 5:
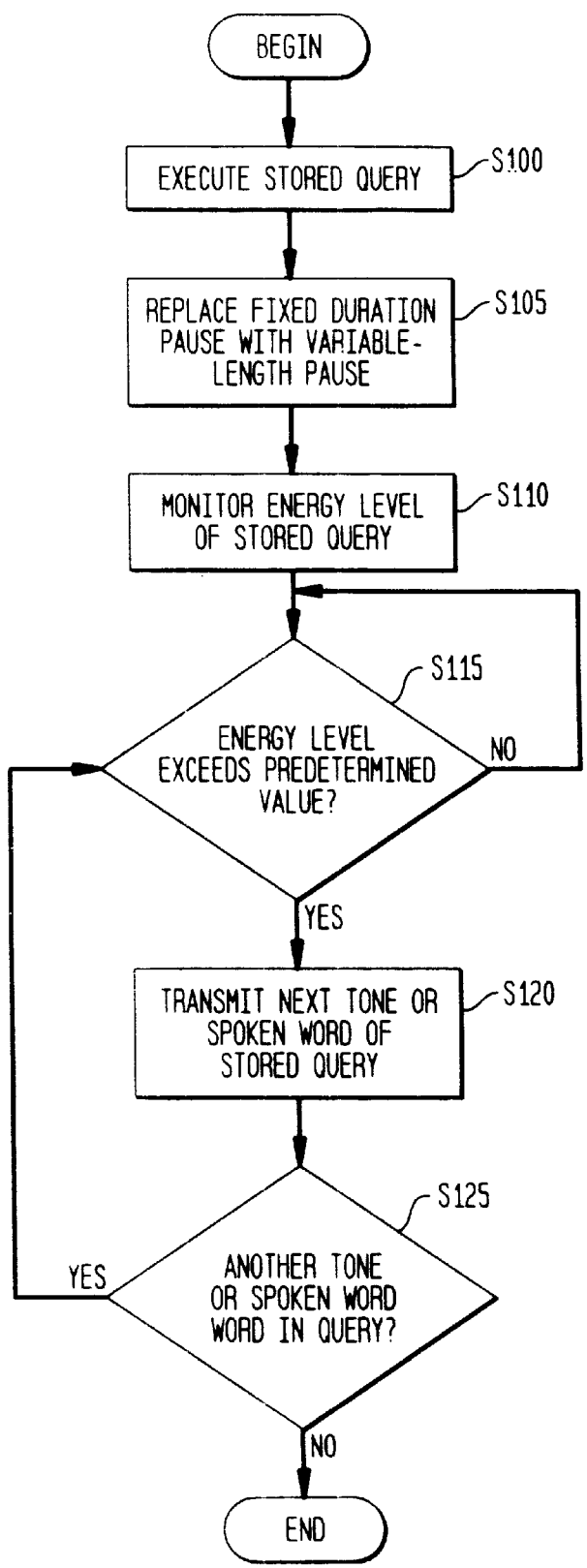
FIG. 5 shows a flowchart for stabilizing the system when overloaded.

Referring now to FIG. 5, the flowchart for stabilizing the system 10 when overloaded is shown. The flowchart begins with Step S100 where the system 10 executes a stored query. At Step S105 a pause of fixed duration in the stored query is replaced with variable-length pauses. At Step S110, the energy level of a signal is monitored. At Step S120 the next tone or spoken word in a query is transmitted when the energy level exceeds a predetermined value, as determined at Step S115. Steps S115 and S120 are repeated for each next tone or spoken word until the end of the query, as determined at Step S125. As stated previously, this stabilizes system 10 against variations in programmed response times resulting from system 10 being overloaded.

Figure 2:
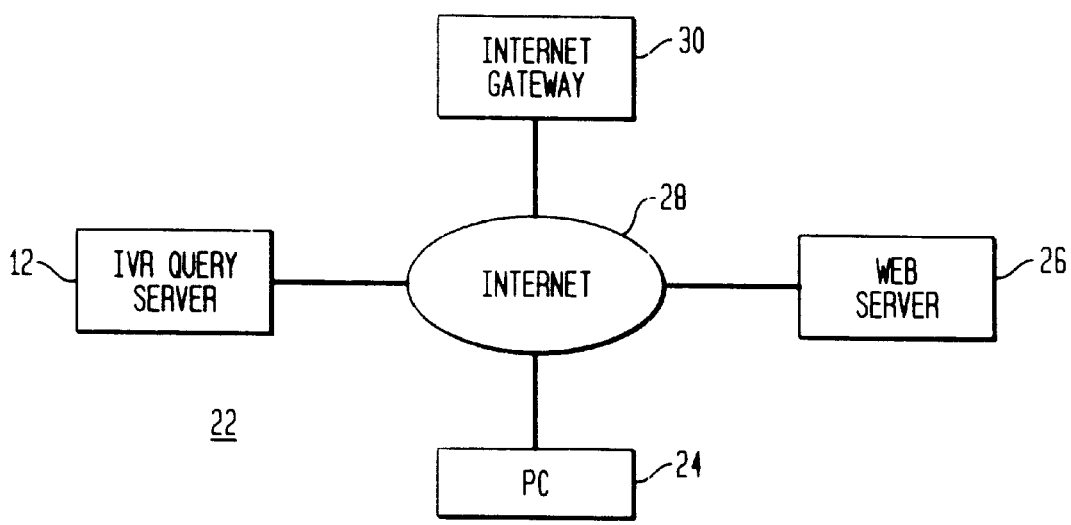
FIG. 2 shows a second exemplary embodiment of an IVR system for storing network queries according to the present invention.

FIG. 2 shows an alternative embodiment of an IVR query system 22 according to the present invention for automatically and selectively accessing information stored on Internet-based information systems, i.e., web servers. In FIG. 2, components having the same function as those shown in FIG. 1 are designated by the same number. In addition, the following components in system 22 have been substituted for and perform the same function as the indicated components they replace from system 10: a computer 24 is substituted for telephone 14; a web server 26 is substituted for IVR server 16; and an Internet 28 is substituted for PSTN 18. System 22 both operates and can be programmed in the same manner as system 10. In system 22, IVR query server 12 stores and executes queries entered by a user using computer 24, which queries are then forwarded to web server 26 via Internet 28 to either retrieve information stored on web server 26 or to perform certain transactions using information stored thereon. System 22 can execute queries from any computer coupled to the network, and can store a large number of complex queries.

Users can use computer 24 to store the sequence of keystrokes, pauses and/or voice commands which comprise a query as a file that can be executed within the IVR menu of system 22 each time the user desires to repeat the particular query. Such queries can be stored on system 22 as messages in an e-mail system accessed through the natural language telephone interface provided by SPS 20, wherein each query specifies the universal resource locator (URL) of the particular web site the user desires to access so that the desired information can be retrieved from the particular web site. Information retrieved and/or the confirmation of the execution of a transaction can then be delivered to the user in any format specified by the user in the same manner as in system 10.

Figure 3:
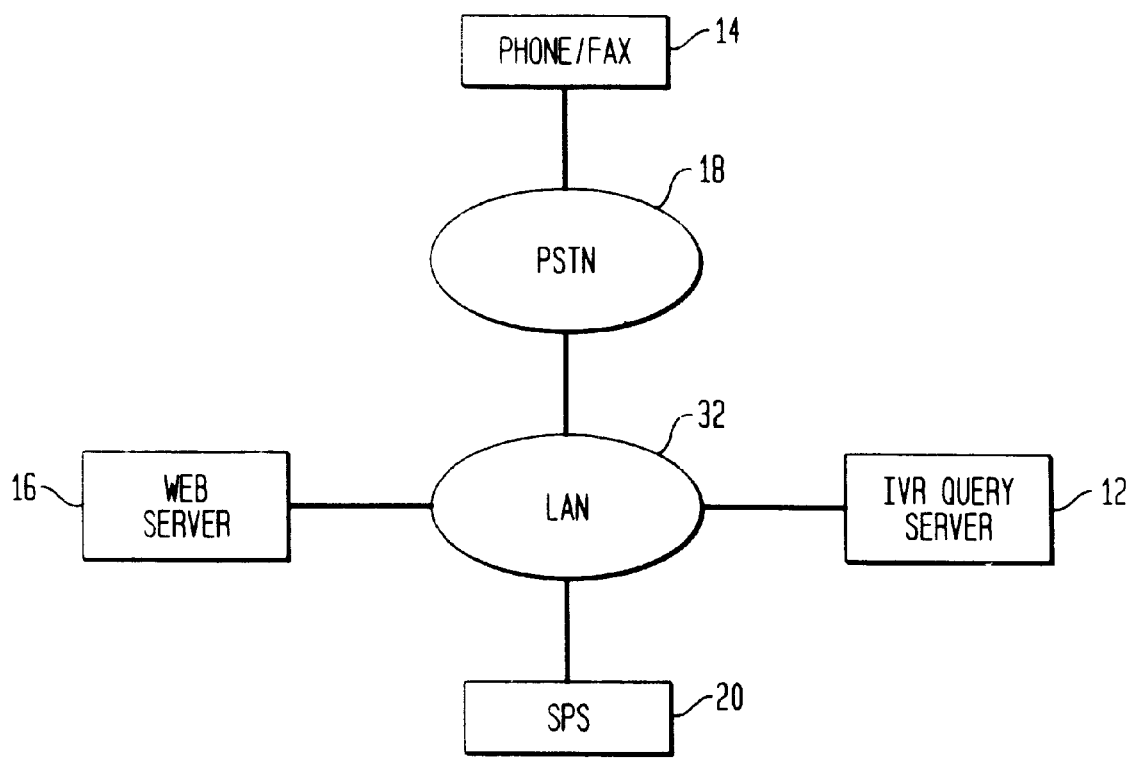
FIG. 3 shows an alternative embodiment of the IVR system shown in FIG. 1 in which the IVR system is based on a local area network (LAN).
Figure 4:
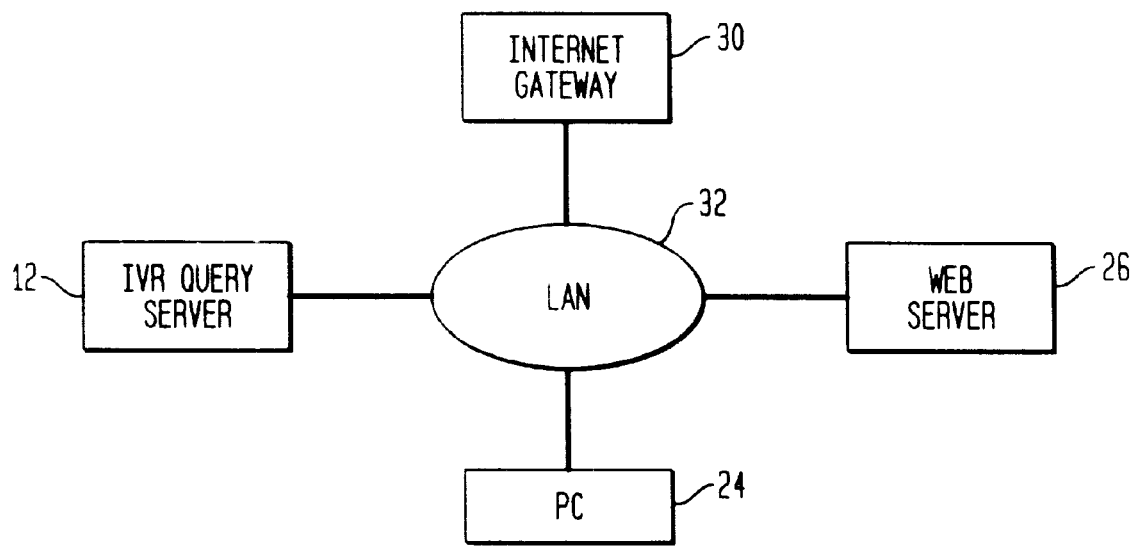
FIG. 4 shows an alternative embodiment of the IVR system shown in FIG. 2 in which the IVR system is based on a LAN.

In two alternative embodiments of the present invention shown in FIGS. 3 and 4, the components of systems 10 and 22, respectively, reside on and are coupled to one another by means of a LAN 32.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. An interactive voice response system for an information network, comprising:

a first server for storing and executing at least one query; and, a second server coupled to the first server for processing the at least one stored query, wherein when the system executes the at least one stored query, a pause in the at least one stored query of a fixed duration is replaced with a variable-length pause, and an energy level of the stored query is monitored such that the next tone in the at least one stored query is transmitted when the energy level exceeds a predetermined value, thereby stabilizing the system against variations in response times resulting from the system being overloaded.

2. The system according to claim 1, wherein a telephone is used to store the at least one query on the first server.

3. The system according to claim 1, wherein a computer is used to store the at least one query on the first server.

4. The system according to claim 1, further comprising a speech processing system enabling the system to recognize and record human speech and enabling the first server to have interactive sessions with at least one user.

5. The system according to claim 4, wherein the speech processing system converts text to speech.

6. The system according to claim 4, wherein the speech processing system converts speech to text.

7. The system according to claim 4, wherein the at least one user creates the at least one query through an interactive voice response menu by entering a sequence of keystrokes on a telephone keypad.

8. The system according to claim 4, wherein the at least one user creates the at least one query through an interactive voice response menu by entering a sequence of keystrokes on a computer keypad.

9. The system according to claim 4, wherein the first server includes a session manager module for managing the set-up, termination, and data transmission of incoming and outgoing calls between the first server and the at least one user.

10. The system according to claim 4, wherein the results of the query are delivered to the at least one user as a facsimile transmission.

11. The system according to claim 4, wherein the results of the query are delivered to the at least one user as an e-mail message.

12. The system according to claim 1, wherein the at least one query is executed a predetermined number of times.

13. The system according to claim 1, wherein the first server includes an interactive voice response store module for storing and replaying the at least one query.

14. The system according to claim 1, wherein the at least one query is executed at a predetermined time.

15. The system according to claim 1, wherein the first server includes a dialog manager module implemented as a software module for composing and replaying the at least one query.

16. The system according to claim 1, wherein when the system executes the at least one stored query, the at least one stored query is replayed as it was originally stored on the first server.

17. The system according to claim 1, wherein when the system executes the at least one stored query, a combination of ASR and DTMF algorithms enable the system to transmit an appropriate response to the at least one stored query from a stored inventory of dial tone sequences and pauses.

18. An interactive voice response system for an information network, comprising:

a first server for storing and executing a query defined by a stored inventory of dial tone sequences and pauses to transmit an appropriate response to the stored inventory of the dial tone sequences and the pauses; and a second server coupled to the first server for processing the stored query wherein the stored query is executed using a combination of automatic speech recognition and dual tone multiple frequency algorithms.

19. A method for storing and executing a query on an interactive voice response system for an information network, comprising the steps of:

storing the query on a first server, the query including a sequence of pauses and dial tones or spoken words;

programming information regarding when and how the stored query is executed;

executing the stored query;

transmitting, to a second server coupled to the first server, the stored query; and, retrieving, by the second server, the information to execute a transaction using the information in response to the stored query.

\* \* \* \* \*